United States Patent
Riegler et al.

[11] 3,929,389
[45] Dec. 30, 1975

[54] EXPANSION BEARING ASSEMBLY FOR A CONVERTER CARRYING TRUNNION

[75] Inventors: Ernst Riegler, Enns; Manfred Schmidt, Linz, both of Austria

[73] Assignee: Vereinigte Österreichische Eisen- und Stahlwerke-Alpine Montan Aktiengesellschaft, Linz, Austria

[22] Filed: Nov. 27, 1974

[21] Appl. No.: 527,536

[30] Foreign Application Priority Data
Dec. 7, 1973  Austria .............................. 10249/73

[52] U.S. Cl.............. 308/6 R; 308/DIG. 8; 308/72; 308/194; 308/207 R; 308/238
[51] Int. Cl.².................... F16C 17/00; F16C 21/00; F16C 33/02
[58] Field of Search........... 308/DIG. 8, 202, 207 R, 308/212, 214, 238, 22, 25, 58, 61, 72, 17.8, 194, 3 R, 6 R, 6 B, 6 A

[56] References Cited
UNITED STATES PATENTS
| | | | |
|---|---|---|---|
| 3,053,591 | 9/1962 | Bensch et al..................... | 308/207 R |
| 3,291,541 | 12/1966 | Dellinger............................. | 308/6 R |
| 3,819,241 | 6/1974 | Memmel......................... | 308/238 X |

FOREIGN PATENTS OR APPLICATIONS
| | | | |
|---|---|---|---|
| 701,213 | 12/1953 | United Kingdom............. | 308/207 R |

Primary Examiner—Robert S. Ward, Jr.
Attorney, Agent, or Firm—Brumbaugh, Graves, Donohue & Raymond

[57] ABSTRACT

An expansion bearing assembly for the carrying trunnion of a converter, for instance a slide bearing, an articulation bearing or a ball and roller bearing. This bearing assembly comprises a sliding bushing axially displaceable within the bearing housing and an inner race secured in place by distance rings fastened to the carrying trunnion. The sliding bushing is provided with bores, into which cylindrical blocks acting as sliding elements are inserted. Said sliding elements are surrounded by sleeves made of bearing metal, in particular of bronze. By the bearing assembly of the invention it is possible to keep the coefficient of friction between sliding parts and fixed parts of the carrying ring constant and low, which means that the occurring axial force is small and that thus the carrying ring is subjected to less wear.

16 Claims, 4 Drawing Figures

EXPANSION BEARING ASSEMBLY FOR A CONVERTER CARRYING TRUNNION

The invention relates to an expansion bearing assembly for a converter carrying trunnion, for instance, a slide bearing, an articulation bearing or a ball and roller bearing having a sliding bushing axially displaceable within the bearing housing and having an inner race secured in place by means of distance rings fastened to the carrying trunnion.

In the fields of general engineering, or gear making, respectively, it is customary to mount a shaft in a fixed bearing on one side and in an expansion bearing on the other side, so that it can accommodate thermal expansion, or assembly inaccuracies, respectively, and in order to guarantee smooth operation.

In a converter plant, too, the converter carrying ring is usually mounted in a fixed bearing with one carrying trunnion and in an expansion bearing with the other carrying trunnion. There exist different embodiments for the expansion bearing construction, e.g. a sliding bushing construction as it is described in Austrian Pat. No. 274,870. For improving the axial movability the outer periphery of the axially displaceable sliding bushing may be coated with a bronze layer enhancing the sliding ability, respectively a bronze sheet may be adhered to said outer periphery. In converters having a closed carrying ring this measure has in general proved to be sufficient; because an axial displacement on account of thermal expansion occurs only over a longer period of time, for instance within 10 to 14 days.

In open, e.g. horseshoe-shaped carrying rings, for converter exchange plants, however, an axial displacement of the bearing by ± 15 mm has to occur during each revolution on account of the excentrically acting load. As a consequence thereof the lubricating film between sliding bronze layer and fixed bushing is being interrupted within a very short time. Thus the coefficient of friction increases, which entails an increase of the axial forces necessary for displacement. This increase of the axial forces causes an increased stress in the open carrying ring and constitutes a danger for the operational reliability of the plant.

The invention aims at avoiding the above mentioned disadvantages and difficulties and it is its object to keep the coefficient of friction between sliding parts and fixed parts in carrying rings with axial movement, in particular in open carrying rings, as constant and low as possible, so that the occurring axial force is small and that consequently the stress in the carrying ring is small and easy to control as far as stability is concerned.

In an expansion bearing of the above described type the invention consists in that into bores of the sliding bushing cylindrical blocks acting as sliding elements are inserted, which are preferably surrounded by sleeves made of a bearing metal, in particular of bronze.

The sliding elements preferably consist of a synthetic material having sliding properties, in particular of polytetrafluorethylene.

According to a preferred embodiment of the invention the sliding elements are arranged only in the pressure zone over approx. one quarter of the periphery of the sliding bushing in one row or in several rows.

The sliding elements may be supported by a protecting bushing or by the expansion bearing stand itself.

According to a further embodiment further sliding elements for accommodating transversal forces may be arranged additionally in the horizontal plane of the bearing on opposite sides within a peripheral range of approx. 30°.

In order that the invention may be more fully understood an embodiment thereof will now be described in more detail by way of example with reference to the accompanying drawings in which FIG. 1 shows a general view of a converter with its bearing assembly.

Figure 1:
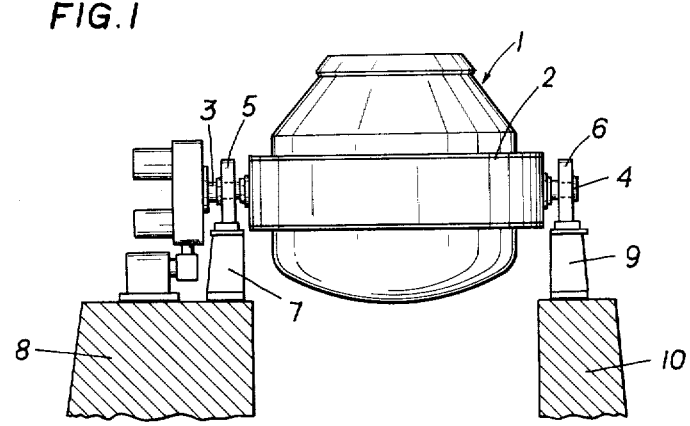
Figure 2:
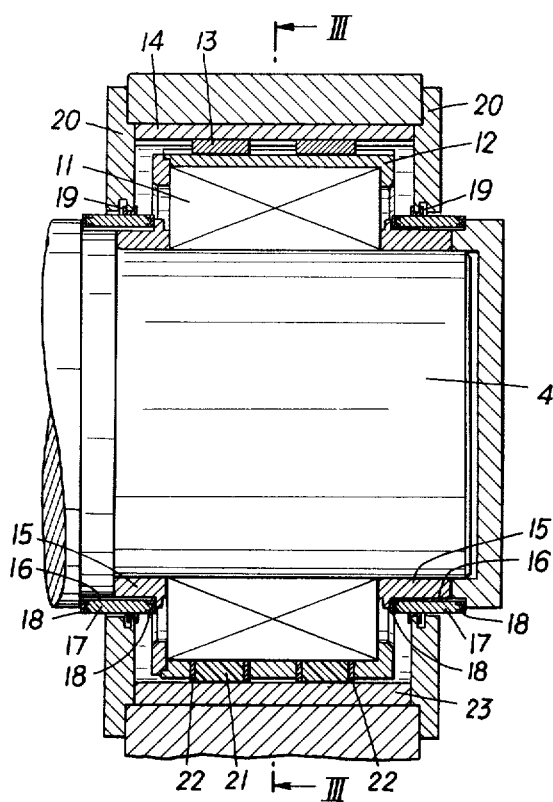

In FIG. 1 the converter is denoted with 1, the carrying ring with 2, the fixed bearing trunnion with 3, the expansion bearing trunnion with 4, the fixed bearing with 5 and the expansion bearing with 6. The fixed bearing 5 is connected to the base 8 via the fixed bearing stand 7 and the expansion bearing 6 is connected to the base 10 via the expansion bearing stand 9. According to FIG. 2 the expansion bearing trunnion 4 is borne in a bearing insert 11; the bearing can have the form of a slide-, articulation-, or ball and roller bearing, in particular a self-aligning roller bearing. Over the outer race of the bearing a hook-shaped sliding bushing 12 is pushed, which is safeguarded against distortion in relation to the lid 14 by means of adjusting springs 13. The bearing is secured to the trunnion by distance sleeves 15. In the distance rings recesses 16 are provided, into which sleeves 17 with sealings 18 are fitted. Another sealing 19 is arranged against the bearing housing 20.

According to the invention in the pressure zone of the bearing in bores of the sliding bushing 12 sliding elements 21 having the form of cylindrical blocks are inserted, which sliding elements preferably consist of a synthetic material having sliding properties, in particular of polytetrafluorethylene. The cylindrical blocks are surrounded by bronze sleeves 22. These bronze sleeves have the advantage of being dirt-repellent, whereby an undesired deformation of the synthetic material, which would lead to its early destruction, is avoided. In the embodiment according to FIG. 2 the sliding elements are supported by a bearing bushing 23 of their own. Another advantage of the arrangement of the bronze sleeves 22 consists in that the distance between the sliding bushing and the fixed bearing bushing 23 can be kept very small, i.e. approx. 7 mm.

In the embodiment illustrated in FIG. 3 sliding elements are provided not only in the lower peripheral range of approx. 90°, which range corresponds to the pressure zone of the bearing, but further sliding elements 21' are additionally arranged on either side in the range of the horizontal axis over a range of approx. 30°, i.e. 15° above and 15° below the horizontal axis. These sliding elements are capable of accommodating transversal forces, which is of importance in skull-pushing. These additional sliding elements 21' also prevent that the converter starts swinging as the sliding elements 21 become worn.

Figure 3:
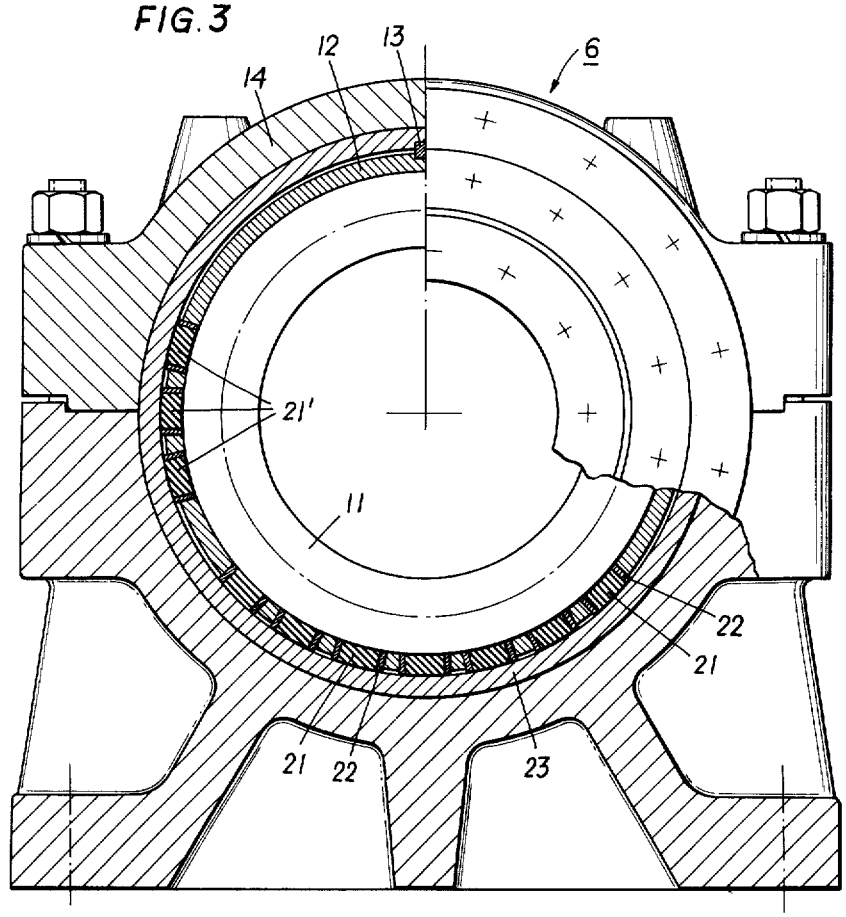
FIGS. 2 and 3 show sections of an embodiment of the expansion bearing of the invention, FIG. 3 being a section along line III—III of FIG. 2.
Figure 4:
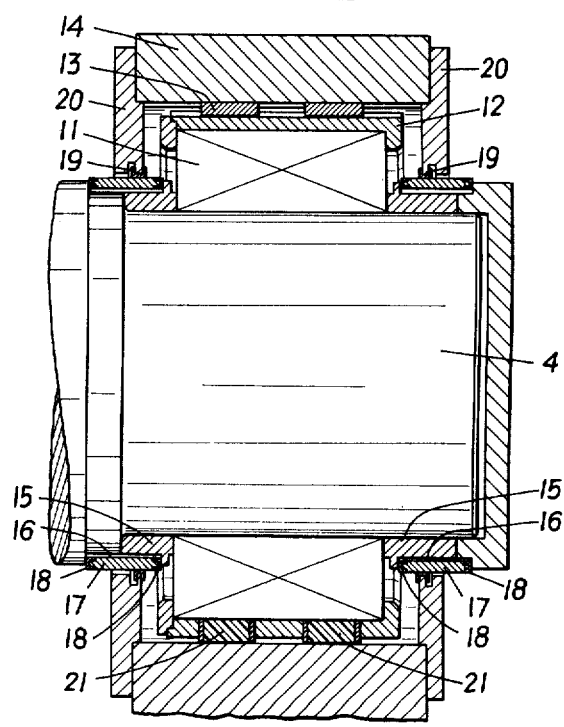
FIG. 4 is an illustration similar to FIG. 2 of another embodiment of the expansion bearing according to the invention.

The embodiment of the expansion bearing according to FIG. 4 is substantially identical with the embodiment illustrated in FIG. 3, with the exception that the arrangement of the bearing bushing 23 is missing; when omitting this bearing bushing the outer diameter of the bearing housing can be made smaller and thus the bearing housing can be constructed less heavy.

What we claim is:
1. An expansion bearing assembly for a converter carrying trunnion, which comprises
   a bearing housing,
   an expansion bearing stand,
   a sliding bushing provided with bores, said sliding bushing being axially displaceable within the bearing housing,
   an inner race secured in place by means of distance rings fastened to the carrying trunnion,
   cylindrical blocks acting as sliding elements peripherally distributed over the sliding bushing and inserted into the bores of the sliding bushing.

2. An expansion bearing assembly as set forth in claim 1, wherein the expansion bearing is a slide bearing.

3. An expansion bearing assembly as set forth in claim 1, wherein the expansion bearing is an articulation bearing.

4. An expansion bearing assembly as set forth in claim 1, wherein the expansion bearing is a ball bearing.

5. An expansion bearing assembly as set forth in claim 1, wherein the expansion bearing is a roller bearing.

6. An expansion bearing assembly as set forth in claim 1, wherein the cylindrical blocks acting as sliding elements are surrounded by sleeves.

7. An expansion bearing assembly as set forth in claim 6, wherein the sleeves are made of a bearing metal.

8. An expansion bearing assembly as set forth in claim 6, wherein the sleeves are made of bronze.

9. An expansion bearing assembly as set forth in claim 1, wherein the cylindrical blocks acting as sliding elements are made of a synthetic material having sliding properties.

10. An expansion bearing assembly as set forth in claim 9, wherein the cylindrical blocks acting as sliding elements are made of polytetrafluorethylene.

11. An expansion bearing assembly as set forth in claim 1, the expansion bearing having a pressure zone, wherein the cylindrical blocks acting as sliding elements are arranged only in the pressure zone over approx. one quarter of the sliding bushing periphery.

12. An expansion bearing assembly as set forth in claim 11, wherein the cylindrical blocks acting as sliding elements are arranged in one row.

13. An expansion bearing assembly as set forth in claim 11, wherein the cylindrical blocks acting as sliding elements are arranged in several rows.

14. An expansion bearing assembly as set forth in claim 1, wherein the cylindrical blocks acting as sliding elements are supported by a protecting bushing.

15. An expansion bearing assembly as set forth in claim 14, wherein the cylindrical blocks acting as sliding elements are supported by the expansion bearing stand.

16. An expansion bearing assembly as set forth in claim 1, further comprising additional sliding elements for accommodating transversal forces, said sliding elements being arranged in the horizontal plane of the bearing on opposite sides over a peripheral range of approx. 30°.

* * * * *